US012748083B2

(12) United States Patent
Iyer et al.

(10) Patent No.: US 12,748,083 B2
(45) Date of Patent: Sep. 29, 2026

(54) FLOW MODULE SELECTOR

(71) Applicant: DH Technologies Development Pte. Ltd., Singapore (SG)

(72) Inventors: Ravi Iyer, Concord (CA); Andrew Kucher, Concord (CA); David Neyer, Concord (CA); Randy Roushall, Concord (CA); Remco Van Soest, Concord (CA); Hao Yang, Redwood City, CA (US)

(73) Assignee: DH, Singapore (SG)

( * ) Notice: Subject to any disclaimer, the term of this patent is extended or adjusted under 35 U.S.C. 154(b) by 440 days.

(21) Appl. No.: 18/281,277

(22) PCT Filed: Mar. 11, 2022

(86) PCT No.: PCT/IB2022/052224
§ 371 (c)(1),
(2) Date: Sep. 8, 2023

(87) PCT Pub. No.: WO2022/190066
PCT Pub. Date: Sep. 15, 2022

(65) Prior Publication Data

US 2024/0175849 A1 May 30, 2024

Related U.S. Application Data

(60) Provisional application No. 63/160,626, filed on Mar. 12, 2021.

(51) Int. Cl.
*G01N 30/72* (2006.01)
*G01N 30/32* (2006.01)
*G01N 30/02* (2006.01)

(52) U.S. Cl.
CPC ......... *G01N 30/32* (2013.01); *G01N 30/7233* (2013.01); *G01N 2030/027* (2013.01);
(Continued)

(58) Field of Classification Search
CPC ............... G01N 30/32; G01N 30/7233; G01N 2030/027; G01N 2030/324;
(Continued)

(56) References Cited

U.S. PATENT DOCUMENTS 4,775,481 A 10/1988 Allington
5,240,603 A * 8/1993 Frank ................ B01D 11/0203 210/659
(Continued)

FOREIGN PATENT DOCUMENTS

CN 101400418 A 4/2009
CN 108226542 A 6/2018
(Continued)

OTHER PUBLICATIONS

International Search Report and Written Opinion, PCT/IB2022/052224, Dated May 31, 2022, pp. 14.

*Primary Examiner* — David J Bolduc
(74) *Attorney, Agent, or Firm* — Potomac Law Group, PLLC; Reza Mollaaghababa; Brian Hairston

(57) ABSTRACT

In one aspect, a system for adjusting flow rate of at least one mobile phase delivered to a liquid chromatography (LC) column is disclosed, which includes a first plurality of pre-calibrated flow modules each configured to receive a first mobile phase at an inlet port thereof and to provide a pre-calibrated range of output flow rates of said first mobile phase at its outlet port, wherein said first plurality of flow modules are configured to provide different ranges of output flow rates of said first mobile phase, and a first selector valve in fluid communication with said first plurality of pre-calibrated flow modules for selecting among said first plurality of pre-calibrated flow modules for selective delivery
(Continued)

of said first mobile phase to said LC column, thereby adjusting the flow rate of the first mobile phase delivered to said LC column.

17 Claims, 8 Drawing Sheets

(52) U.S. Cl.
CPC . *G01N 2030/324* (2013.01); *G01N 2030/326* (2013.01); *G01N 2030/328* (2013.01)

(58) Field of Classification Search
CPC ....... G01N 2030/326; G01N 2030/328; G01N 30/24; G01N 30/20; G01N 30/34; G01N 30/72
See application file for complete search history.

(56) References Cited

U.S. PATENT DOCUMENTS

| | | | | |
|---|---|---|---|---|
| 5,322,626 | A * | 6/1994 | Frank | B01D 11/0203 210/659 |
| 5,630,706 | A * | 5/1997 | Yang | G01N 30/36 417/18 |
| 5,664,938 | A * | 9/1997 | Yang | F04B 49/065 137/550 |
| 6,648,609 | B2 * | 11/2003 | Berger | F04B 49/225 |
| 7,343,932 | B2 * | 3/2008 | Manson | F16K 11/072 137/236.1 |
| 8,215,922 | B2 * | 7/2012 | Berger | F04B 23/06 417/313 |
| 9,163,618 | B2 * | 10/2015 | Wikfors | G01N 30/32 |
| 11,123,655 | B2 * | 9/2021 | Srinivasan | B01D 11/0207 |
| 2005/0121392 | A1 * | 6/2005 | Hoffman | B01D 15/166 210/143 |
| 2005/0236049 | A1 * | 10/2005 | Manson | F16K 11/072 137/625.11 |
| 2006/0054543 | A1 * | 3/2006 | Petro | G01N 30/34 210/101 |
| 2007/0000313 | A1 * | 1/2007 | Weissgerber | G01N 30/36 700/282 |
| 2008/0164193 | A1 * | 7/2008 | Minoda | G01N 30/32 210/198.2 |
| 2008/0264491 | A1 * | 10/2008 | Klee | G01N 30/24 137/99 |
| 2009/0205409 | A1 * | 8/2009 | Ciavarini | G05D 11/132 73/61.56 |
| 2010/0162801 | A1 * | 7/2010 | Hayashi | G01N 30/30 73/61.57 |
| 2011/0049031 | A1 * | 3/2011 | Cappiello | G01N 30/38 210/198.2 |
| 2013/0340508 | A1 * | 12/2013 | Osaka | G01N 30/468 73/61.53 |
| 2016/0001198 | A1 * | 1/2016 | Tegeler | G01N 30/32 95/241 |
| 2016/0187304 | A1 * | 6/2016 | Wikfors | G01N 1/28 73/863 |
| 2019/0070571 | A1 * | 3/2019 | Jackson | B01F 33/30 |
| 2019/0369062 | A1 | 12/2019 | Fogwill et al. | |
| 2020/0064316 | A1 * | 2/2020 | Shang | G01N 30/6095 |
| 2020/0088695 | A1 * | 3/2020 | Shreve | G01N 30/04 |
| 2021/0033574 | A1 * | 2/2021 | Heise | C12N 15/1017 |
| 2021/0388909 | A1 * | 12/2021 | Keller | F16K 11/0743 |
| 2022/0011276 | A1 * | 1/2022 | Gritti | G01N 30/06 |

FOREIGN PATENT DOCUMENTS

| | | | |
|---|---|---|---|
| CN | 112204391 | A | 1/2021 |
| EP | 1297889 | A2 | 4/2003 |
| EP | 1724576 | A2 | 11/2006 |
| GB | 2036370 | A | 6/1980 |
| WO | 0146687 | A2 | 6/2001 |
| WO | 2007109157 | A3 | 3/2008 |

* cited by examiner

FLOW MODULE SELECTOR

RELATED APPLICATIONS

This application is a 35 U.S.C. 371 national stage filing of International Application No. PCT/IB2022/052224, filed on Mar. 11, 2022, which claims priority to U.S. Provisional Application No. 63/160,626 filed on Mar. 12, 2021, and is entitled "Flow Module Selector", the content of which is incorporated herein by reference in its entirety.

BACKGROUND

The present teachings are generally directed to methods and systems for delivering analytes to an LC column of a mass spectrometry system.

Liquid chromatography mass spectroscopy (LC/MS) is an analytical technique for determining the elemental composition of test substances with both quantitative and qualitative applications. LC/MS can be useful in identifying unknown compounds, determining the structure of a particular compound by observing its fragmentation, and quantifying the amount of a particular compound in a sample. By way of example, a sample can be introduced into an LC column and be separated into a plurality of components that elute from the LC column in time-separated sequences. The eluants can then be ionized and the generated ions can be analyzed by downstream mass analyzers to obtain structural and compositional information about the substituents of the sample under study.

In many conventional LC/MS systems, the flow rate of a sample introduced into the LC column can be regulated by using calibrated fluid flow modules, which are typically in the form of flow restrictors. More specifically, flow rate measurements can be performed by measuring a pressure differential across a calibrated fluid flow module. Due to limits on the range, accuracy, and precision of pressure measurements, there is a limited range over which a flow module can be used effectively. To address different ranges of flow rates (e.g., from nanoliters/min to microliters/min), different calibrated restrictors are generally used. By way of example, different models of an instrument can incorporate different flow restrictors providing different flow rates. In other cases, user-replaceable cartridges with different flow rates can be provided so as to allow a user to modify the flow rate via replacing one cartridge with another.

Such conventional approaches require hardware changes that can limit the flexibility and flow range of the instruments. Further, adjusting the flow rate by using different cartridges can be time-consuming and can also potentially introduce new sources of failure, e.g., leaks, clogs, etc.

Accordingly, there is a need for systems and methods for facile changes of flow rates of samples introduced into an LC column of an LC/MS system.

SUMMARY

In one aspect, a system for adjusting flow rate of at least one mobile phase delivered to a liquid chromatography (LC) column is disclosed, which includes a first plurality of pre-calibrated flow modules each configured to receive a first mobile phase at an inlet port thereof and to provide a pre-calibrated range of output flow rates of the first mobile phase at its outlet port, where the first plurality of fluid flow modules is configured to provide different ranges of output flow rates of the first mobile phase. The system further includes a first selector valve in fluid communication with the first plurality of pre-calibrated fluid flow modules for selecting from among the first plurality of pre-calibrated fluid flow modules for selective delivery of the first mobile phase to the LC column, thereby adjusting the flow rate of the first mobile phase delivered to the LC column.

In some embodiments, the system includes a first container for storing the first mobile phase, where the first container is in fluid communication with the first plurality of pre-calibrated flow modules for delivering the first mobile phase thereto.

In some embodiments, the system can further include a first pump for delivering the first mobile phase from the first container to the first plurality of fluid flow modules.

In some embodiments, the system can further include a controller for adjusting a speed of the first pump for tuning the flow rate of the first mobile phase delivered to the first plurality of the fluid flow modules.

In some embodiments, the first selector valve can include a first plurality of inlet ports each of which is in fluid communication with an outlet port of one of the first plurality of fluid flow modules and a first outlet port through which the first mobile phase exits the first elector valve.

In some embodiments, the system can further include a second plurality of pre-calibrated fluid flow modules each configured to receive a second mobile phase at an inlet port thereof and to provide a pre-calibrated range of output flow rates of the second mobile phase at its outlet port, where the second plurality of fluid flow modules are configured to provide different ranges of output flow rates of the second mobile phase.

In some embodiments, the system can include a second container for storing the second mobile phase, where the second container is in fluid communication with the second plurality of pre-calibrated fluid flow modules for delivering the second mobile phase thereto.

In some embodiments, the selector valve is fluidly coupled to the second plurality of pre-calibrated flow modules for selecting from among the second plurality of flow modules for delivery of the second mobile phase to the LC column, thereby adjusting the flow rate of the second mobile phase delivered to the LC column.

In some embodiments, the system can further include a second pump for delivering the second mobile phase to the second plurality of the flow modules. In some embodiments, the controller is configured to adjust a speed of the second pump for tuning the flow rate of the second mobile phase delivered to the LC column. Further, in some embodiments, the second pump is configured to provide a different dynamic range of fluid flow rate than a dynamic range of the fluid flow rate provided by the first pump.

In some embodiments, the controller can be configured to adjust a speed of any of the first and the second pump to change dynamically (i.e., during runtime) the flow rate of any of the first and second mobile phases delivered to the LC column. In some embodiments, such adjustment of the flow rates can be used to change the relative concentrations of the first and the second mobile phases in a mixture of the mobile phases delivered to the LC column.

In some embodiments, the selector valve can include a first plurality of inlet ports, where each inlet port is in fluid communication with an outlet port of one of the first plurality of fluid flow modules and a first outlet port through which the first mobile phase exits the selector valve.

In some embodiments, the selector valve further includes a second plurality of inlet ports each of which is in fluid communication with an outlet port of one of the second plurality of flow modules to receive the second mobile phase and further includes a second outlet port through which the second mobile phase exits the selector valve.

In some embodiments, the system can further include a mixing element having a first inlet port for receiving the first mobile phase from the first selector valve and a second inlet port for receiving the second mobile phase from the second selector valve to generate a mixed mobile phase, where the mixing element includes an outlet port for delivering the mixed mobile phase to the LC column.

In some embodiments, the system can include a first pressure sensor that is disposed between the first pump and the first plurality of fluid flow modules for measuring the fluid pressure delivered to the first plurality of fluid flow modules. In some embodiments, the system can further include a second pressure sensor disposed between the second pump and the second plurality of fluid flow modules for measuring the fluid pressure delivered to the second plurality of fluid flow modules. Further, in some embodiments, the system can include a third pressure sensor that is disposed between the outlet ports of any of the first and the second plurality of fluid flow modules and the mixing element for measuring the pressure of fluid delivered from any of the first and the second plurality of fluid flow modules to the mixing element. In some such embodiments, the second pump is configured to provide a dynamic range of fluid flow that is different from a dynamic range of fluid flow provided by the first pump.

In a related aspect, a system for adjusting flow rate of at least one mobile phase delivered to a liquid chromatography (LC) column is disclosed, which includes a first plurality of pre-calibrated flow modules each of which is configured to receive a first mobile phase at an inlet port thereof and to provide a pre-calibrated range of output flow rates of the first mobile phase at its outlet port. The first plurality of fluid flow modules are configured to provide different ranges of output flow rates of the first mobile phase. A first selector valve is in fluid communication with the first plurality of pre-calibrated flow modules for selecting from among the first plurality of pre-calibrated fluid flow modules for selective delivery of the first mobile phase to the LC column, thereby adjusting the flow rate of the first mobile phase delivered to the LC column. The system can further include a first container for storing the first mobile phase, where the first container is in fluid communication with the first selector valve to deliver the first mobile phase thereto. In some such embodiments, the first selector valve can include a first inlet port for receiving the first mobile phase and a first plurality of outlet ports each of which is fluidly coupled to one of the first plurality of the flow modules. Further, the system can include a second plurality of pre-calibrated flow modules, where each flow modules is configured to receive a second mobile phase at an inlet port thereof and to provide a pre-calibrated range of output flow rates of the second mobile phase at its outlet port. The second plurality of fluid flow modules are configured to provide different output flow rates of the second mobile phase.

In some embodiments, the system can include a second container for storing a second mobile phase. In some such embodiments, the first selector valve can include a second inlet port for receiving the second mobile phase from the second container and a second plurality of outlet ports each of which is fluidly coupled to one of said second plurality of flow modules for selective delivery of the second fluid flow modules. The system can further include a mixing element having a first inlet port configured to receive the first mobile phase from any of the first plurality of fluid flow modules when that flow module is selected via said selector valve. The mixing element can further include a second inlet port configured to receive the second mobile phase from any of the second plurality of flow modules when that flow module is selected via said selector valve. The mixing element is configured to mix the first and second mobile phases and to generate a mixed mobile phase. The mixing element can have an outlet port in communication with the LC column to deliver the mixed mobile phase to the LC column.

In some embodiments, a first pressure sensor is disposed between the first pump and the selector valve for measuring pressure of the first mobile phase delivered to said selector valve. In some such embodiments, a second pressure sensor is disposed between the second pump and the selector valve for measuring pressure of the second mobile phase delivered to the selector valve. Further, in some embodiments, a third pressure sensor is disposed between the outlet ports of any of the first and the second plurality of fluid flow modules and the mixing element for measuring pressure of the fluid delivered from any of the first and said second plurality of flow modules to the mixing element.

In some such embodiments, the first and the second pumps are configured to provide different dynamic ranges of fluid flow. In some embodiments, the system can include a second container for storing the second mobile phase. A second plurality of pre-calibrated fluid flow modules are configured to receive the second mobile phase from the second container, where each of the second plurality of pre-calibrated flow modules provides a pre-calibrated range of output flow rates of the second mobile phase.

In some embodiments of the above system, a second selector valve is in fluid communication with the second plurality of pre-calibrated flow modules for selecting from among the second plurality of pre-calibrated flow modules for selective delivery of the second mobile phase to the LC column, thereby adjusting the flow rate of the second mobile phase delivered to said LC column.

In some embodiments, each of the first plurality of fluid flow modules includes an inlet port for receiving the first mobile phase from the first container and an outlet port in fluid communication with the first selector valve. Each of the second plurality of fluid flow modules includes an inlet port for receiving the second mobile phase from the second container and an outlet port in fluid communication with the second selector valve. A mixing element having a first inlet port can be in fluid communication with the outlet port of said first selector valve to receive the first mobile phase and a second inlet port in fluid communication with the outlet port of the second selector valve to receive the second mobile phase, where the mixing element is configured to mix the first and second mobile phases to generate a mixed mobile phase. The mixing element can have an outlet port for delivering the mixed mobile phase to the LC column. A first pump can be employed to deliver the first mobile phase from the first container to the first plurality of flow modules. A second pump can be employed to deliver the second mobile phase from the second container to the second plurality of flow modules. In some such embodiments, the first and the second pumps can be configured to provide different dynamic ranges of the fluid flow rates.

In a related aspect, a system for adjusting the flow rate of at least one mobile phase delivered to a liquid chromatography (LC) column is disclosed, which includes a container for storing a first mobile phase, a first plurality of pre-calibrated flow modules each configured to receive the first mobile phase from the container at an inlet port thereof and to provide a pre-calibrated range of output flow rates of the first mobile phase at its outlet port, where the first plurality of fluid flow modules is configured to provide different ranges of output flow rates of the first mobile phase. A first selector valve can be in fluid communication with at least a portion of the first plurality of pre-calibrated flow modules for selecting from among those modules for selective delivery of the first mobile phase to the LC column, thereby adjusting the flow rate of the first mobile phase delivered to said LC column. At least one of the first plurality of pre-calibrated fluid flow modules is configured to provide a continuous flow of said first phase from said first container to said LC column.

In some embodiments, the system can include a second container for storing a second mobile phase. The system can further include a second plurality of pre-calibrated fluid flow modules each configured to receive the second mobile phase from the second container at an inlet port thereof and to provide a pre-calibrated range of output flow rates of the second mobile phase at its outlet port, where the second plurality of fluid flow modules is configured to provide different ranges of output flow rates of the second mobile phase. A second selector valve can be in fluid communication with at least a portion of the second plurality of pre-calibrated flow modules to select from among those flow modules for selective delivery of the second mobile phase to the LC column, thereby adjusting the flow rate of the second mobile phase delivered to the LC column. In some such embodiments, at least one of the second plurality of fluid flow modules is configured to provide a continuous flow of the second mobile phase from the second container to the LC column.

In some embodiments, the system further includes a mixing element having a first inlet port for receiving the continuous flow of the first mobile phase provided by one of the first plurality of flow modules as well as an output flow associated with another one of the plurality of first fluid flow modules selected by the first selector valve. The mixing element can have a second inlet port for receiving the continuous flow of the second mobile phase provided by the flow module of the second plurality of flow modules providing a continuous flow of the second mobile phase as well as an output flow of another one of said plurality of second flow modules selected by said second selector valve. The mixing element is configured to generate a mixed mobile phase by mixing the first and second mobile phases received at its first and second inlet ports and deliver said mixed mobile phase to the LC column.

DETAILED DESCRIPTION

The present disclosure relates generally to systems and methods for delivering one or more mobile phases to an LC column of an LC/MS system by employing an automated valve to select from among multiple pre-calibrated flow modules. As discussed below, the systems and methods according to the present teachings can provide a wide range of flow rates without any hardware changes. A variety of different embodiments incorporating the present teachings are discussed below for providing specific, targeted flow ranges, a large overall flow range, with higher precision. The embodiments discussed below also provide more flexibility for generating a variety of mobile phase compositions, e.g., by mixing different mobile phases in a variety of different concentration ratios. Although the following embodiments are described in connection with delivering two mobile phases to a mixing element, which can in turn generate a mixed mobile phase for delivery to an LC column, the present teachings can in fact be employed to deliver only one mobile phase or more than two mobile phases (e.g., 3, 4, 5, or more mobile phases) to an LC column, e.g., via a mixing element.

Various terms are used herein in accordance with their ordinary meanings in the art. The term “about” as used herein denotes a variation of at most 10% around a numerical value. The term “substantially” as used herein denotes a deviation, if any, of at most 10% relative to a complete condition and/or state.

Figure 1:
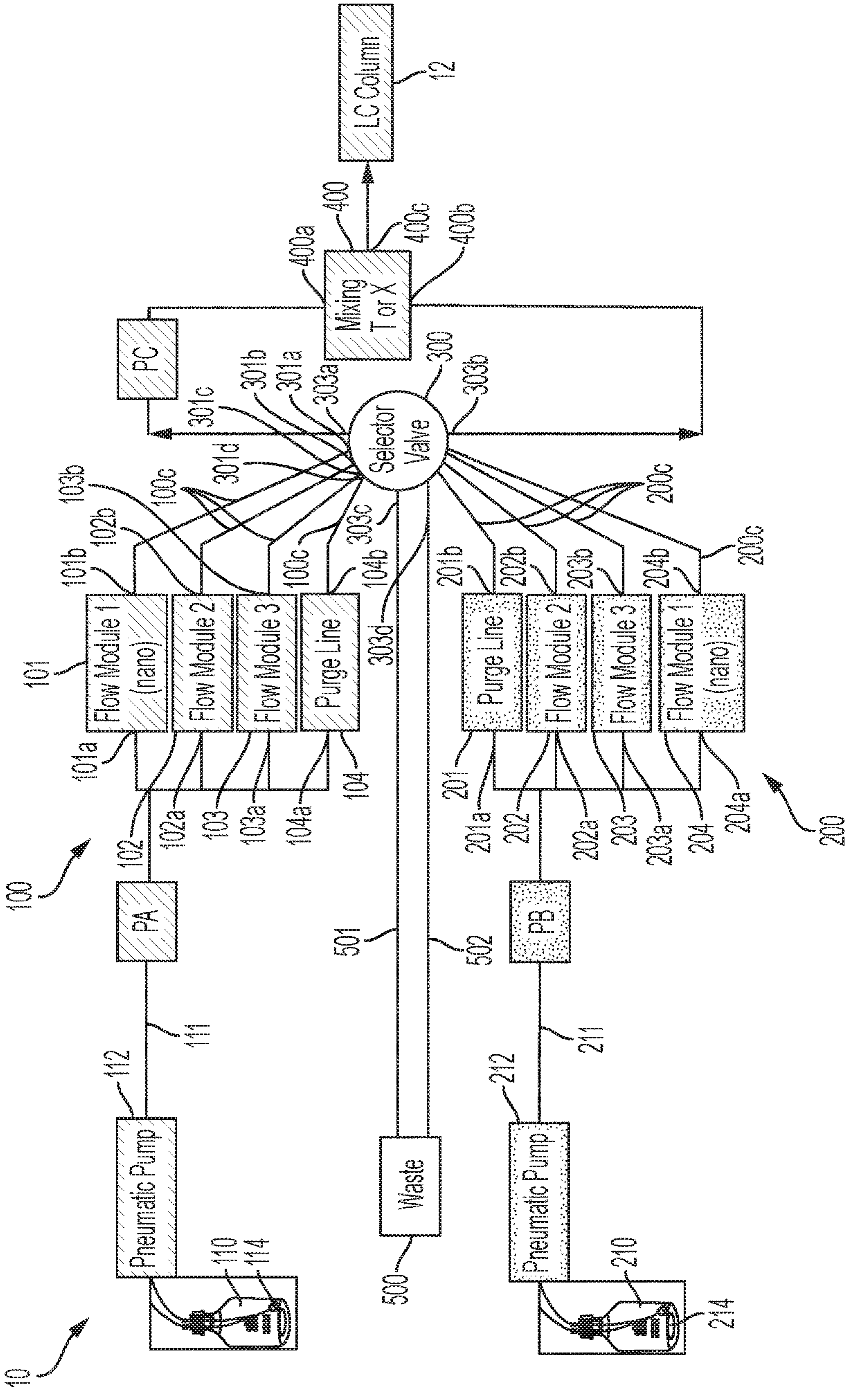
FIG. 1 schematically depicts a system according to an embodiment of the present teachings for delivering two mobile phases to a mixing element, which can in turn deliver a mixture of the mobile phases to an LC column of a mass spectrometry system, FIG. 2 schematically depicts a system according to another embodiment of the present teachings for delivering two mobile phases to a mixing element, which can in turn deliver a mixture of the mobile phases to an LC column of a mass spectrometry system, FIG. 3 schematically depicts a system according to another embodiment of the present teachings for delivering two mobile phases to a mixing element, which can in turn deliver a mixture of the mobile phases to an LC column of a mass spectrometry system, FIG. 4 schematically depicts a system according to another embodiment of the present teachings for delivering two mobile phases to a mixing element, which can in turn deliver a mixture of the mobile phases to an LC column of a mass spectrometry system, FIG. 5A schematically depicts an example of an implementation of a selector valve according to an embodiment, which can operate under control of a controller with input received from a GUI, FIG. 5B schematically an example of an implementation of the controller depicted in FIG. 5A, FIG. 6 schematically depicts an LC column and trap disposed upstream of the LC column, where different flow rates can be used for loading the trap and introducing a sample onto the LC column, and FIG. 7 schematically depicts an LC/MS system in which a delivery system according to an embodiment of the present teachings for delivering one or more mobile phases to the LC column is incorporated.

FIG. 1 schematically depicts a system 10 for delivering two mobile phases (e.g., liquid solutions containing one or more analytes of interest), individually or in combination, to a liquid chromatography (LC) column 12 and allowing adjustment of the flow rates of these mobile phases via the use of multiple flow modules that provide different ranges of flow rates for the mobile phases and at least one selector valve that allows selecting from among those fluid flow modules for adjusting the flow rates of the mobile phases delivered to the LC columns, as discussed in more detail below.

More specifically, in this embodiment, the system 10 includes two sets of fluid flow modules 100 and 200, where the fluid flow modules 100 are fluidly coupled to a container 110 via a pneumatic pump 112 and the fluid flow modules 200 are fluidly coupled to a container 210 via a pneumatic pump 212. In this embodiment, the container 110 stores a first mobile phase 114 and the container 210 stores a second mobile phase 214.

With continued reference to FIG. 1, in this embodiment, the set of fluid flow modules 100 includes three fluid flow modules 101, 102, 103 (herein also referred to as the "first plurality of fluid flow modules"), each of which is configured to provide a pre-calibrated range of flow rates, and a purge module 104 that can allow purging the content of the container 110, as discussed in more detail below.

While in some embodiments the pre-calibrated ranges of flow rates associated with these fluid flow modules are distinct, in other embodiments the fluid flow rates associated with at least two of the fluid flow modules can be partially overlapping.

The fluid flow modules 101, 102, 103, and the purge module 104 include inlet ports 101*a*, 102*a*, 103*a*, and 104*a*, respectively, for receiving the first mobile phase from the container 110 via a fluid line 111. Further, the fluid flow modules 101, 102, 103, and the purge module 104 include outlet ports 101*b*, 102*b*, 103*b*, and 104*b*, respectively, through which the first mobile phase exits these modules. A pressure sensor PA is positioned between the pneumatic pump 112 and the plurality of fluid flow modules 100 to measure the pressure of the first mobile phase as it is delivered by the pneumatic pump 112 to the fluid modules 100.

The purge module 201 and the fluid flow modules 202, 203, and 204 (herein also referred to as "the second plurality of fluid flow modules") include inlet ports 201*a*, 202*a*, 203*a*, 204*a*, respectively, for receiving the second mobile phase 214 from the container 210, and outlet ports 201*b*, 202*b*, 203*b*, 204*b*, respectively, through which the second mobile phase can exit the fluid flow modules 200. A pressure sensor PB is positioned between the pneumatic pump 212 and the plurality of fluid modules 200 to measure the pressure of the second mobile phase as it is delivered by the pneumatic pump 212 to the fluid modules 200.

By way of example, in this embodiment, each of the fluid flow modules 100 and 200 can be implemented as a flow restrictor. Such flow restrictors are commercially available.

The system 10 further includes a selector valve 300 having a first plurality of inlet ports 301*a*, 301*b*, 301*c*, and 301*d*, which can receive the first mobile phase from the outlet ports 101*b*, 102*b*, 103*b*, and 104*b* of the fluid modules 100 via a plurality of fluid lines 100*c*, and a second plurality of inlet ports 302*a*, 302*b*, 302*c*, 302*d*, which can receive the second mobile phase from the outlet ports 201*b*, 202*b*, 203*b*, and 204*b* of the fluid modules 200 via a plurality of fluid lines 200*c*.

The selector valve 300 further includes two outlet ports 303*a* and 303*b*. The outlet ports 303*a* and 303*b* are coupled, respectively, to inlet ports 400*a* and 400*b* of a mixing element 400. The outlet port 303*a* of the selector valve 300 allows the output fluid flow of any of the fluid flow modules 101/102/103 that is selected by the selector valve 300 to reach the mixing element 400 and the outlet port 303*b* of the selector valve 300 allows the output fluid flow of any of the fluid flow modules 202/203/204 that is selected by the selector valve 300 to reach the mixing element 400.

In this embodiment, a pressure sensor PC is disposed between the outlet port 303*a* of the selector valve 300 and the mixing element 400 for measuring the pressure of the first mobile phase flowing from the selector valve's outlet 303*a* to the mixing element 400. Though not shown in this embodiment, in other embodiments, a pressure sensor can also be disposed between the outlet port 303*b* of the selector valve and the mixing element 400.

With continued reference to FIG. 1, the selector valve 300 further includes two outlet ports 303*c* and 303*d* that allow the flow of the first and the second mobile phases received by the selector valve to a waste container 500 via fluid lines 501 and 502, respectively. By way of example, the content of each of the containers 112 and 212 can be purged via the purge modules 104 and 201 and the selector valve 300.

The mixing element mixes the received first and second mobile phases to generate a mixed mobile phase, which can be delivered to the LC column 12 via an outlet port 400*c* of the mixing element 400.

The fluid flow modules 100 and 200 can provide a wide range of flow rates. In some embodiments, the range of flow rates provided by the fluid flow modules 100 and 200 are configured so as to allow obtaining a mixed mobile phase with different relative concentrations of the first and the second mobile phases. In some embodiments, a range of flow rates provided by the fluid flow modules 101/102/103 are significantly different from the range of flow rates provided by the fluid flow modules 202/203/204. Further, as noted above, in this embodiment, within each set of the fluid flow modules 100/200, the fluid flow modules can provide different flow rates of the mobile phase, where in some cases the different ranges of flow rates provided by at least two of the fluid flow modules within the first and second sets of fluid flow modules can be at least partially overlapping.

A system according to the present teachings for delivering one or more mobile phases to an LC column allows adjusting the concentration ratios of two or more mobile phases in a mixture of those mobile phases without a need for any hardware change, and even during run-time.

Figure 2:
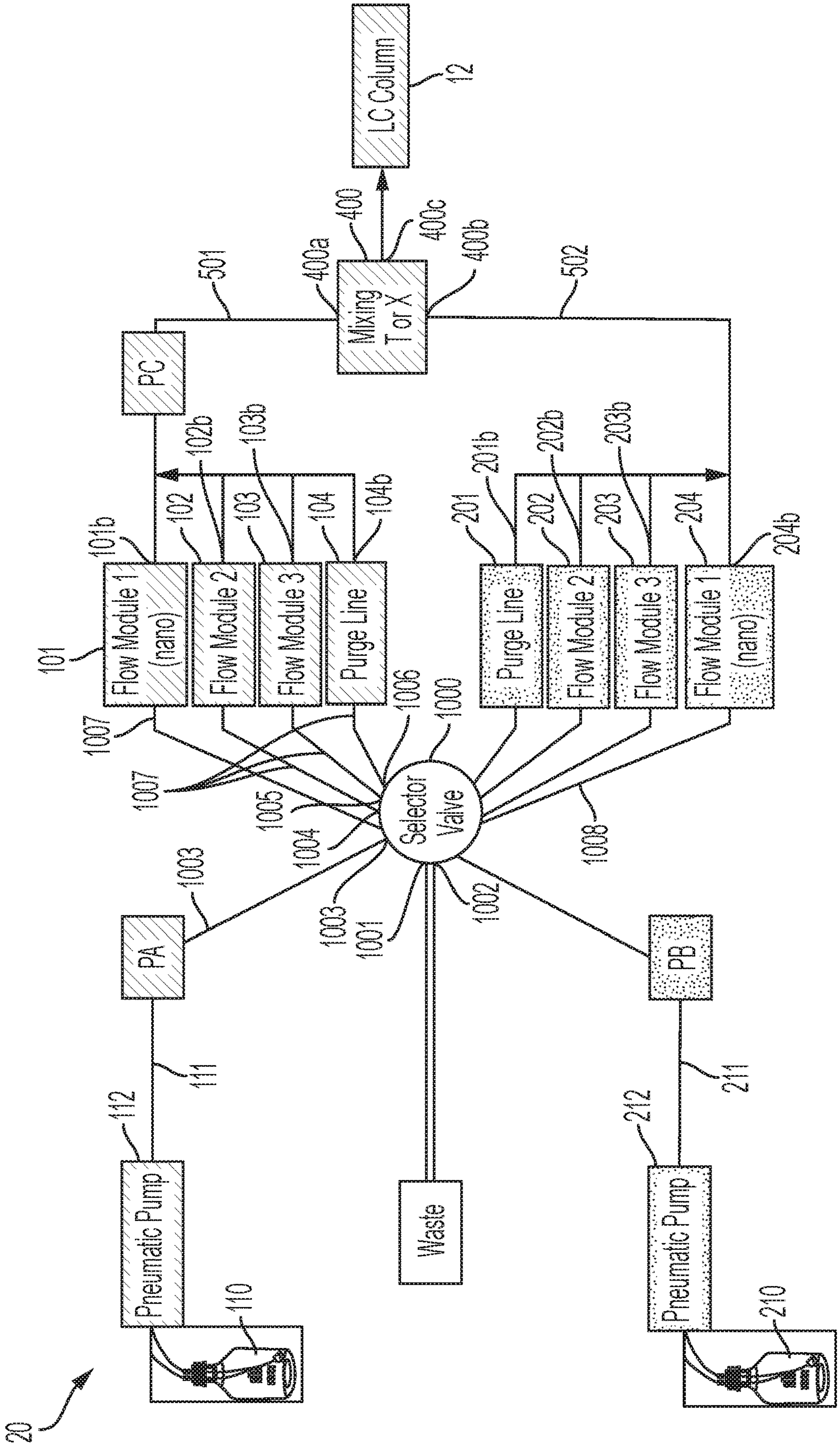

FIG. 2 schematically depicts a system 20 according to another embodiment of the present teachings for delivering two mobile phases (e.g., liquid solutions containing one or more analytes of interest), individually or in combination, to the liquid chromatography (LC) column 12. In contrast with the previous embodiments in which the selector valve was positioned between the two sets of fluid flow modules and the mixing element, in this embodiment, the two sets of the fluid flow modules are positioned between the selector valve and the mixing element.

More specifically, in this embodiment, the system 20 includes a selector valve 1000 having two inlet ports 1001 and 1002, where the inlet port 1001 receives a first mobile phase from the first container 110 via the fluid line 111 and the second inlet port 1002 receives a second mobile phase from the second container 210 via the fluid line 211. Similar to the previous embodiment, the pneumatic pumps 112 and 212 facilitate the flow of the mobile phases from the containers 110 and 210 to the respective inlet ports of the selector valve 1000.

With continued reference to FIG. 2, the selector valve 1000 further includes four outlet ports 1003, 1004, 1005, and 1006, that are fluidly connected via a plurality of fluid lines 1007 to the fluid flow modules 101, 102, 103, and the purge module 104 via their inlet ports thereof (not numbered in this figure for brevity). The selector valve 1000 also includes four additional outlet ports 1008, 1009, 1010, and 1011 that are fluidly connected via a plurality of fluid lines 1012 to the purge module 201, and the plurality of fluid flow modules 202, 203, and 204 via the inlet ports of these modules (not numbered in this figure for brevity).

Similar to the previous embodiments, the flow modules 101/102/103/104 include outlet ports 101*b*, 102*b*, 103*b*, and 104*b* that fluidly connect the outlet ports of these fluid flow modules via a fluid line 501 to the inlet port 400*a* of the mixing element 400. Further, the purge module 201 and the plurality of fluid flow modules 202, 203, and 204 include a plurality of outlet ports 201*b*, 202*b*, 203*b*, and 204*b* that fluidly connect these fluid modules, via a fluid line 502, to the other inlet port 400*b* of the mixing element 400.

The selector valve 1000 can be employed to selectively pressurize any of the purge and fluid flow modules 100 or 200, individually or any desired combinations thereof, for selective delivery of the mobile phases to the mixing element 400. As discussed above, the mixing element 400 mixes the received mobile phases to generate a mixed mobile phase, which can be delivered to the LC column via the output port 400*c* of the mixing element.

In some embodiments, at least one of the fluid flow modules can provide a direct connection between a container storing a mobile phase and the mixing element. Such an arrangement allows maintaining a continuous flow of at least one mobile phase to the LC column while using one or more selector valves to augment the continuous flow with one or more mobile phases (e.g., the same as or different from the continuously flowing mobile phase).

Figure 3:
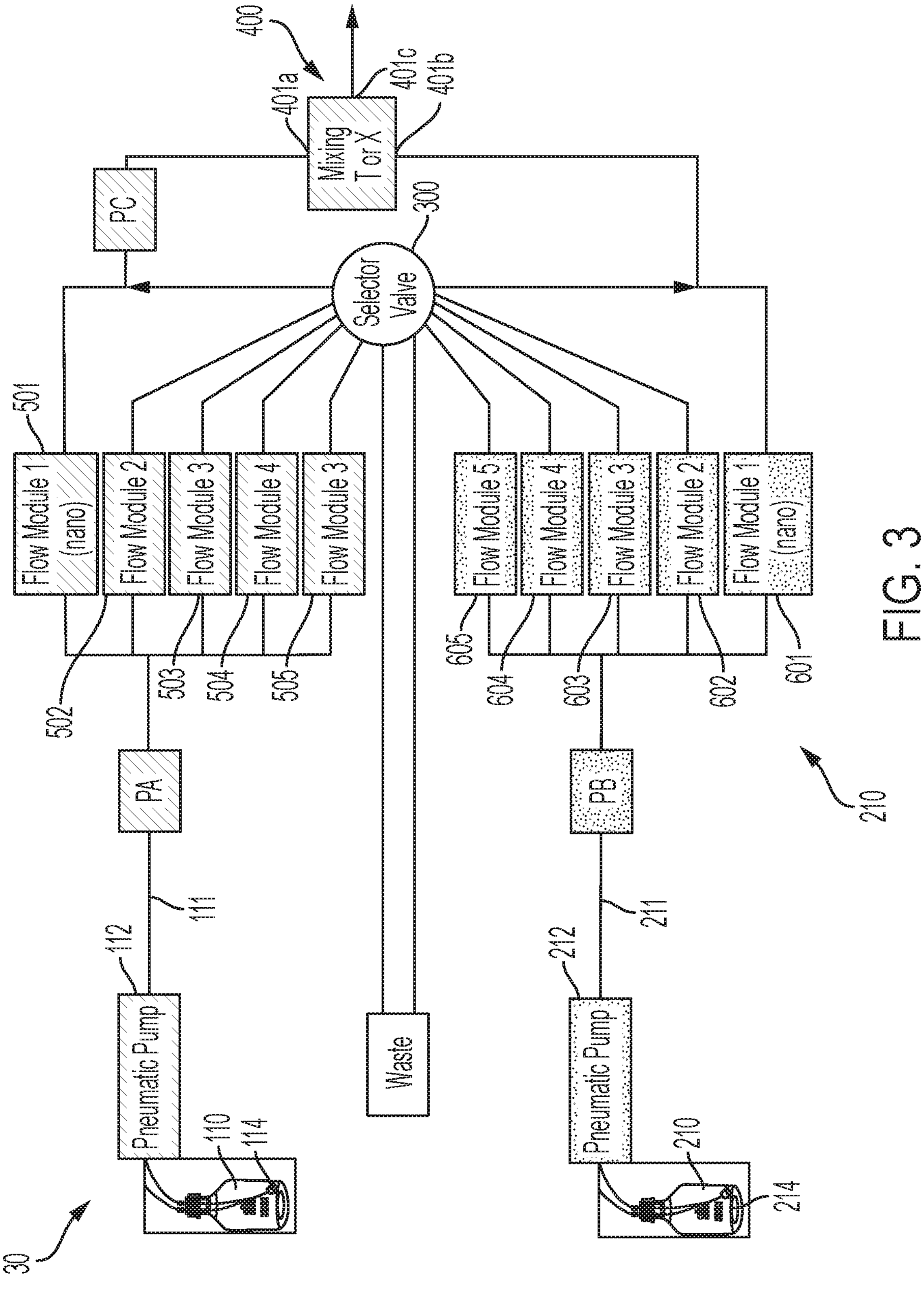

By way of example, FIG. 3 schematically depicts an embodiment of such a system 30, which is similar to the system 10 discussed above except that in this embodiment two of the fluid flow modules directly connect each of the containers 110 and 210 to the mixing element 400 to deliver a continuous flow of the first and the second mobile phases (114/214) to the mixing element 400.

More specifically, in this embodiment, the system 30 includes a first plurality of fluid flow modules 500, which includes fluid flow modules 501, 502, 503, 504, and 505 and a second plurality of fluid flow modules 600, which include fluid flow modules 601, 602, 603, 604, and 605.

The fluid flow modules 500 receive the first mobile phase 114 from the container 110 via the fluid line 111 through their inlet ports 501*a*, 502*a*, 503*a*, 504*a*, and 505*a* and the fluid flow modules 600 receive the second mobile phase 214 from the container 210 via the fluid line 211 through their inlet ports 601*a*, 602*a*, 603*a*, 604*a*, and 604*a*. Two pressure sensor PA and PB allow measuring the pressure of the first and the second mobile phases delivered to the first and the second fluid flow modules 500/600.

In this embodiment, the fluid flow module 501 provides direct fluid coupling between the container 111 and the mixing element 400 to provide a continuous flow of the first mobile phase to the mixing element. Further, the fluid flow module 601 provides direct fluid coupling between the container 211 and the mixing element 400 to provide a continuous flow of the second mobile phase to the mixing element. More specifically, an outlet port 501*b* of the fluid flow module 501 is directly connected to the inlet port 401 of the mixing element 400 and the outlet port 601*b* of the fluid flow module 601 is directly connected to the input port 402 of the mixing element 400. This allows providing a continuous flow of the first and the second mobile phases to the mixing element, where the flow rate of the first mobile phase introduced into the mixing element is determined by the flow rate provided by the fluid flow module 501 and the flow rate of the of the second mobile phase introduced into the mixing element is determined by the flow rate provided by the fluid flow module 601.

The outlet ports 502*b*, 503*b*, 504*b*, and 505*b* of the fluid flow modules 502, 503, 504, and 505 are fluidly connected to a first plurality of inlet ports 1, 2, 3, and 4 of the fluid selector valve 2000 and the outlet ports 602*b*, 603*b*, 604*b*, and 605*b* of the fluid modules 602, 603, 604, and 605 are fluidly connected to a second plurality of inlet ports 5, 6, 7, and 8 of the fluid selector valve 2000. An output port 9 of the selector valve 2000 is fluidly connected to the first input port 401*a* of the mixing element 400 and an output port 10 of the selector valve 2000 is fluidly connected to the second inlet port 401*b* of the mixing element.

The selector valve can be employed to select from among the fluid flow module 502*b*, 503*b*, 504*b*, and 505*b* and the fluid flow modules 602*b*, 603*b*, 604*b*, and 605*b*, individually or in different combinations (e.g., one fluid flow module from the fluid flow modules 500 and one fluid flow module from the fluid flow modules 600). This allows augmenting the fluid flow provided by the fluid modules 501 and 601, which provide a continuous flow of the first and the second mobile phases. The system provides a great degree of flexibility in adjusting the flow of the first and the second mobile phases to the mixing element and the LC column. For example, the system allows providing only a continuous flow of the first or the second mobile phase to the mixing element, and hence the LC column by activating only the fluid flow module 501 or 601. Alternatively, a continuous flow of both the first and the second mobile phases to the mixing element and hence the LC column can be provided via concurrent activation of both of the fluid flow modules 501 and 601. Further, as noted above, the fluid flow provided by any of the continuous fluid flow module 501 or 601 can be augmented by using the selector valve to activate any one of the other fluid modules of the first and second plurality of fluid flow module 500/600.

Although in the above embodiments only a single selector valve is employed, in other embodiments a plurality of selector valves can be utilized to select from among fluid flow modules of different banks of fluid flow modules. By way of example, FIG. 4 schematically depicts an embodiment of such a system 40 that includes a first plurality of fluid flow modules 700 and a second plurality of fluid flow modules 800, where the fluid flow modules 700 receive the first mobile phase 114 from the first container 110 via a plurality of inlet ports 701 through a fluid line 111 and the fluid flow modules 800 receive the second mobile phase 214 from the second container 210 via a plurality of inlet ports 801 through a fluid line 211.

In this embodiment, the fluid flow modules 700 include a plurality of outlet ports 702 that are fluidly connected to a plurality of inlet ports 3000*a* of a selector valve 3000. The selector valve 3000 includes an outlet port 3000*b* that is in fluid communication with the inlet port 401*a* of the mixing element 400. The selector valve 3000 can be employed to select from among the plurality of the fluid flow modules 700 to fluidly connect the selected fluid flow module to the mixing element, thereby adjusting the flow rate of the first mobile phase introduced into the mixing element.

Figure 4:
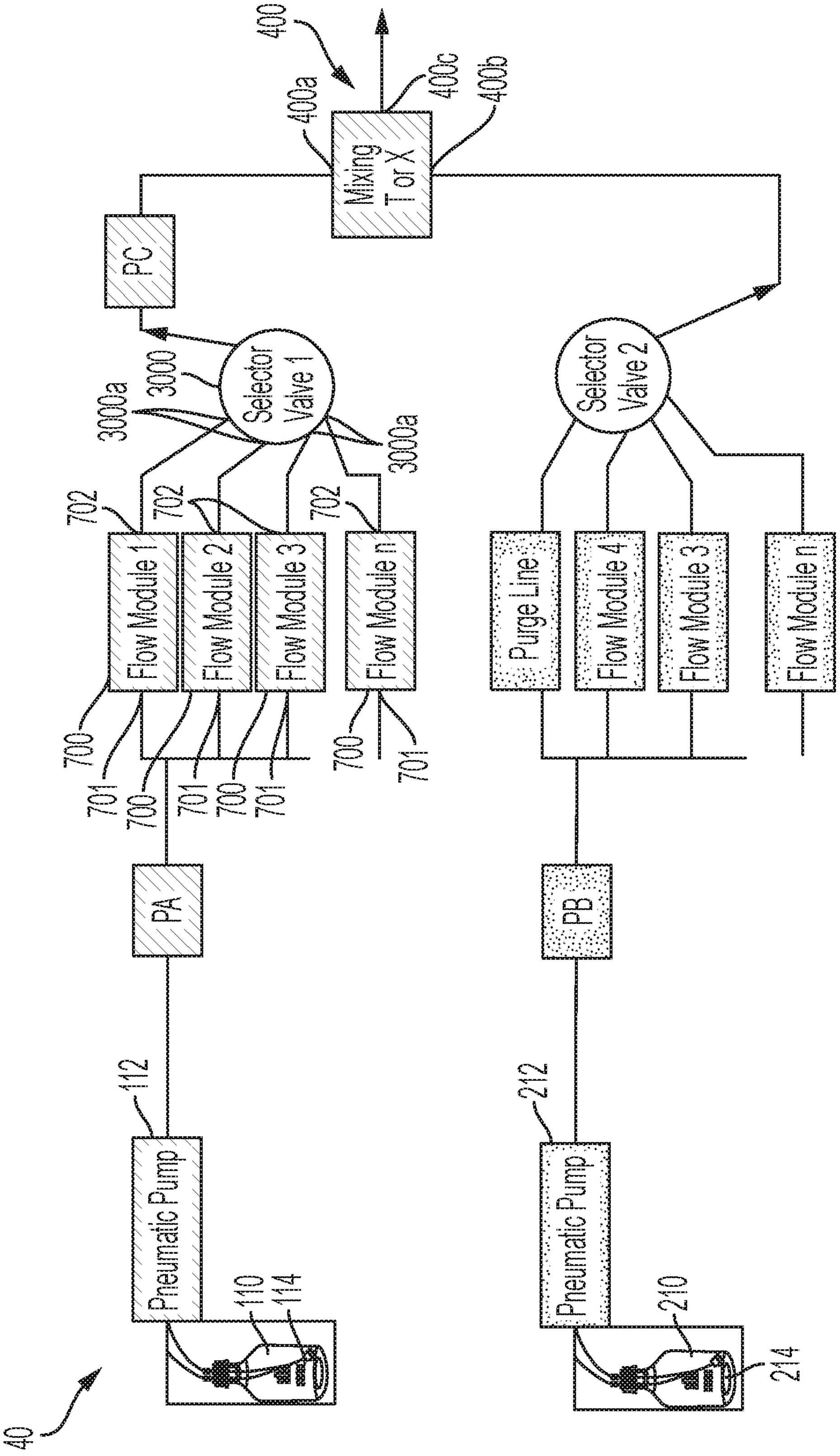

With continued reference to FIG. 4, the fluid flow modules 800 include a plurality of outlet ports 802 that are fluidly connected to a plurality of inlet ports 4000*a* of another selector valve 4000. The selector valve 4000 includes an outlet port 4000*b* that is fluidly connected to another inlet port 401*b* of the mixing element 400.

The selector valve 4000 can be employed to select from among the plurality of the fluid flow modules 800 to fluidly connect the selected fluid flow module to the mixing element, thereby adjusting the flow rate of the second mobile phase introduced into the mixing element.

The mixing element can in turn mix the first and the second mobile phases to generate a mixed mobile phase, which can be delivered to the LC column 12 via the output port 401*c* of the mixing element 400. The selector valves allow adjusting the flow rates of the first and the second mobile phases delivered to the mixing element, thereby adjusting the concentration ratios of the first and the second mobile phases in the mixed mobile phase that is delivered to the LC column.

Similar to the previous embodiments, the pressure sensor PA measures the pressure of the first mobile phase delivered to the fluid flow modules 700 and the pressure sensor PB measures the pressure of the second mobile phase delivered to the fluid flow modules 800. Further, the pressure sensor PC measures the pressure of the first mobile phase delivered via the selector valve 3000 to the mixing element 400. Though not shown in this embodiment, a pressure sensor can also be employed to measure the pressure of the second mobile phase delivered to the mixing element.

Figure 5A:
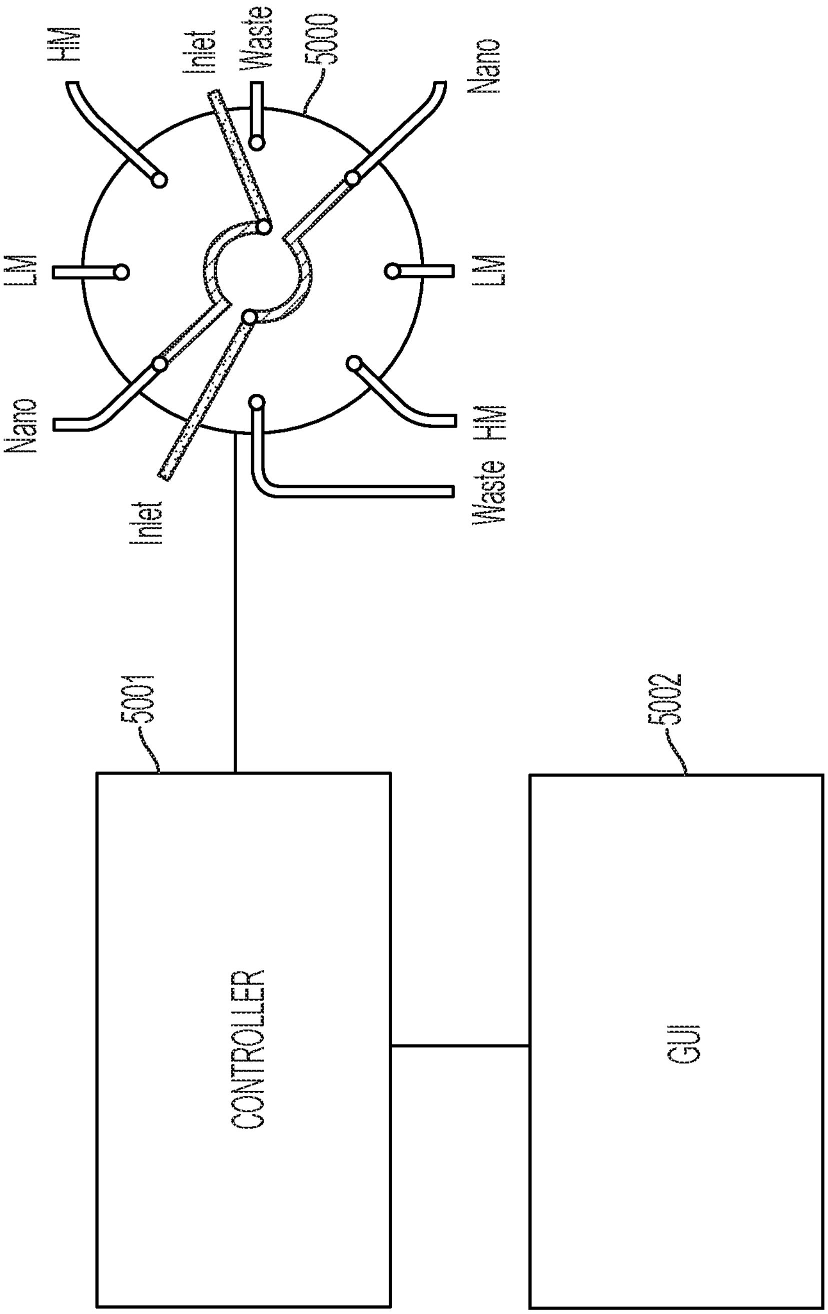

A system according to the present teachings for delivering one or more mobile phases to an LC column of a mass spectrometry system can provide a number of advantages. For example, such a system can allow the introduction of one or more mobile phases to an LC column over a range of flow rates without a need for hardware changes. By way of example, FIG. 5A schematically depicts an example of a selector valve 5000 for use in various embodiments of the present teachings, which can provide flow rates in the nanoliters/min regime, low microliters/min regime, and high microliters/min regime. In this example, the selector valve 5000 can also provide access to a waste container, e.g., in a manner discussed above.

With continued reference to FIG. 5A, a controller 5001 is employed to control the setting of the selector valve 5000 to various modes of operation corresponding to different flow rates. Further, a graphical user interface (GUI) 5002 is provided to allow a user to communicate with the controller 5001 to set the desired mode of operation of the selector valve. Similar controllers and GUIs can be employed in the above embodiments for controlling the operation of the selector valves.

Figure 5B:
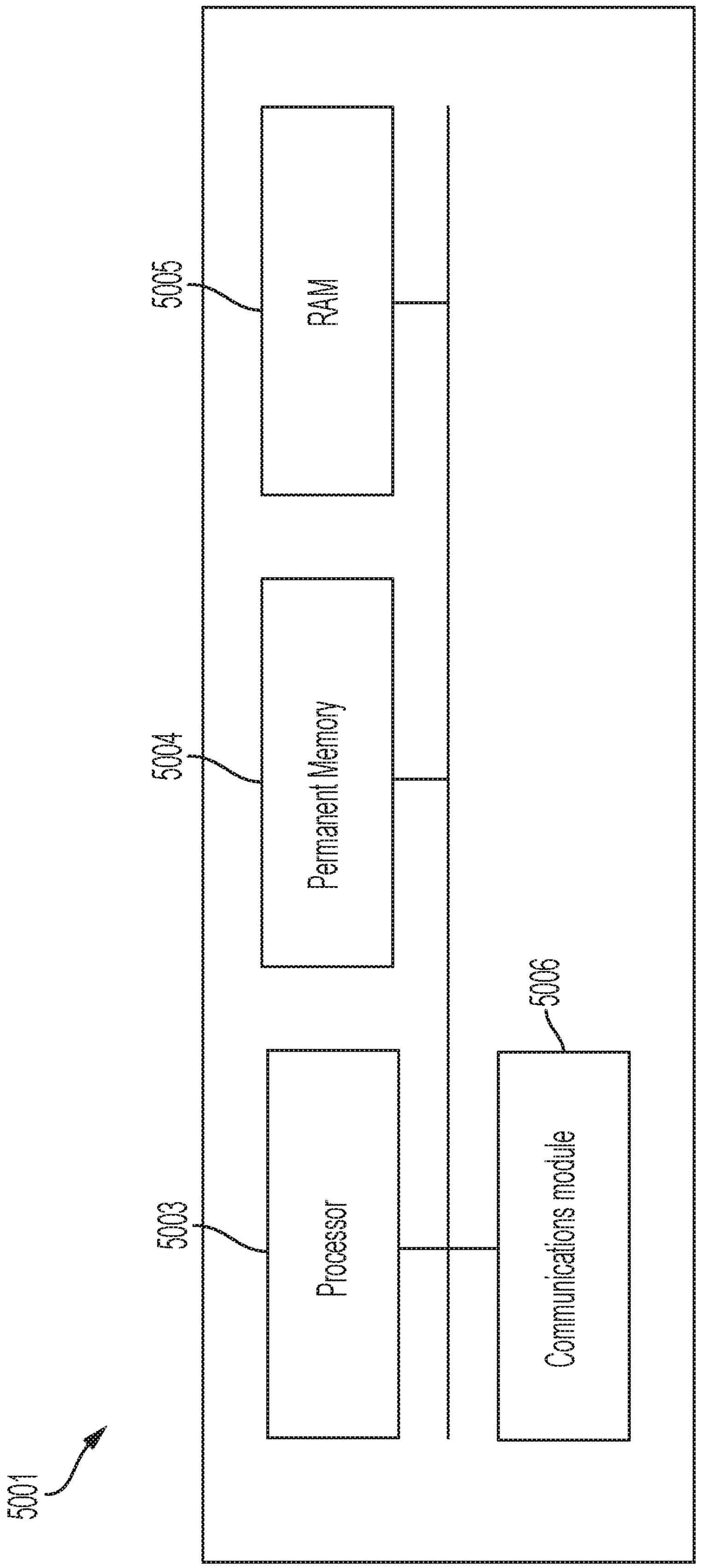

The controller and the GUI can be implemented using techniques known in the art as informed by the present teachings. By way of example, FIG. 5B schematically depicts an example of implementation of the controller 5001. In this embodiment, the controller 5001 includes, among other elements known in the art, a processor 5003, a permanent memory 5004, a random access memory (RAM) 5005, and a communication module 5006, and a communications bus 5007 that allows the processor to communicate with various components of the controller. The communications module 5006 can provide wired or wireless communication, e.g., Bluetooth®, WiFi®, or other suitable protocols, to the GUI 5002 for receiving instructions from a user. The instructions for operating the selector valve can be stored in the permanent memory 5004 and can be loaded onto RAM 5005 during runtime for execution.

In some embodiments, the selector valve can be operated based on a predefined schedule to adjust the flow rates of the mobile phases delivered to the LC column.

Figure 6:
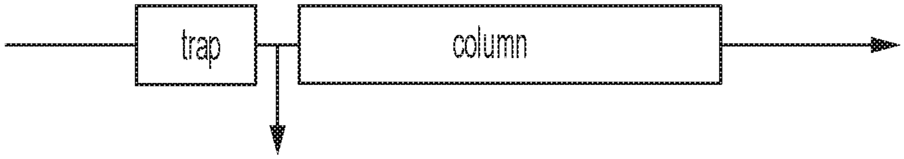

As noted above, a system according to the present teachings can be employed for selecting different workflows with respect to the delivery of one or more mobile phases to an LC column of a mass spectrometry system (e.g., direct injection, trap/elute, nanoliters/min or microliters/min delivery rates). By way of example, FIG. 6 schematically depicts one example of an application of a system according to an embodiment of the present teachings for delivering one or more mobile phases to an LC column. In this embodiment, one or more mobile phases (e.g., a mixture of mobile phases) are first introduced onto a trap column and then onto an LC column. A system according to the present teachings can be employed to load the mobile phase(s) onto the trap column at a higher flow rate and then switch to a lower flow rate for chromatography.

A system according to the present teachings for delivering one or more mobile phases to an LC column of a mass spectrometry system can be incorporated into a variety of mass spectrometry systems. By way of example, such systems can include mass spectrometers using a variety of mass analyzers, such as, one or more quadrupole mass analyzers, a time-of-flight mass analyzer and combinations thereof.

Figure 7:
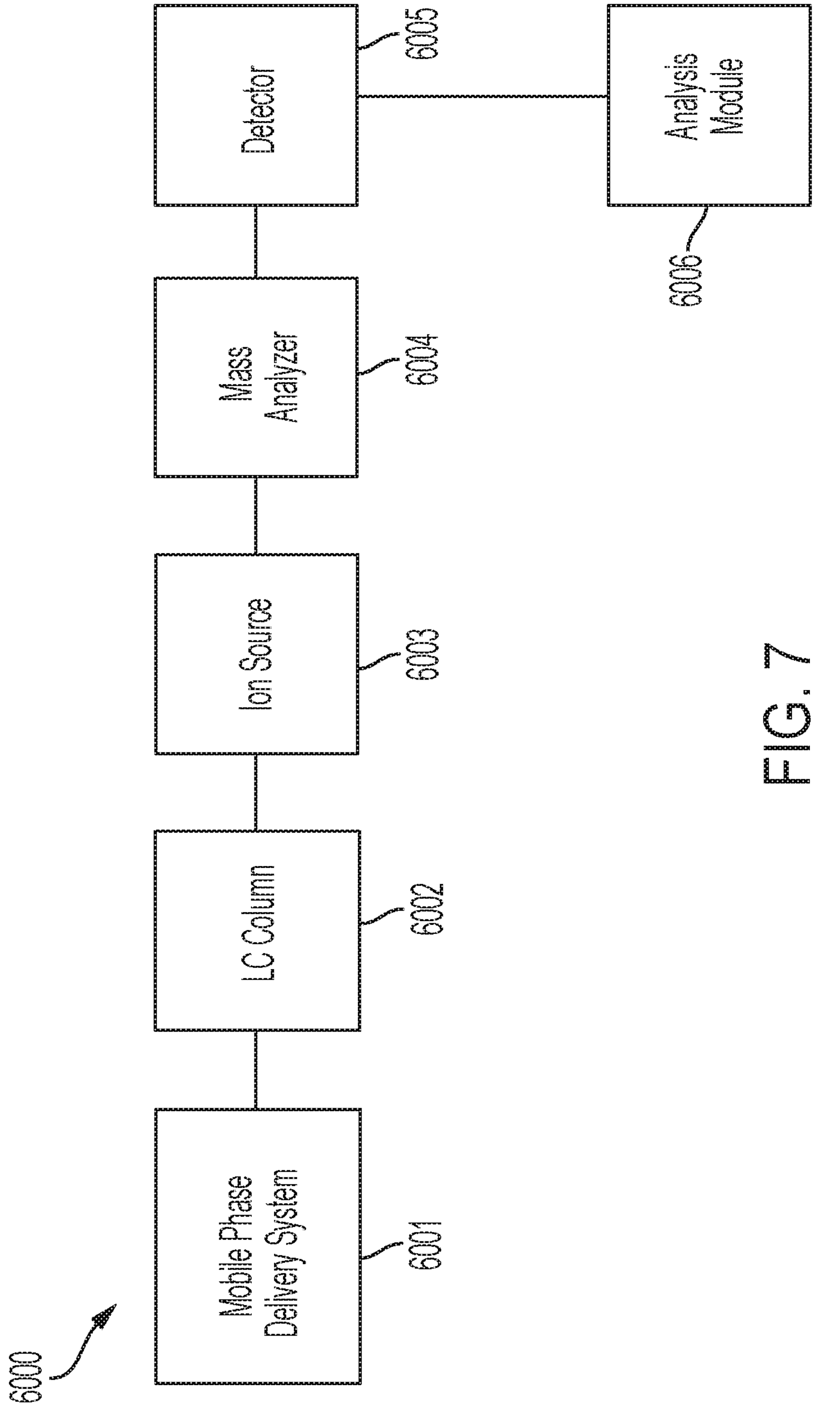

FIG. 7 schematically illustrates an example of a mass spectrometry system 6000 in which a system according to the present teachings for the delivery of one or more mobile phases is incorporated. More specifically, the illustrated system 6000 includes a mobile-phase delivery system 6001 according to an embodiment of the present teachings, such as the above delivery systems. The output of the mobile delivery system is introduced into a liquid chromatography (LC) column 6002 and the eluent(s) from the LC column are introduced into an ion source 6003 to ionize one or more analytes present in the sample received from the LC column. The ions are then transferred to one or mass analyzers 6004 of the mass spectrometer. An ion detector 6005 disposed downstream of the mass analyzer(s) 6004 can detect ions passing through the mass analyzer and generate detection signals in response to the detection of the ions. An analysis module 6006 can receive the detection signals generated by the ion detector 6005 and analyze those signals to generate a mass spectrum of the generated ions.

A variety of different types of mass analyzers can be employed in the mass spectrometry system 6000. By way of example, the mass analyzer can be a quadrupole or a time of flight mass analyzer. For example, in some embodiments, multiple tandem quadrupole mass analyzers can be employed to perform MS/MS mass analysis. In some such embodiments, one or more quadrupole mass analyzers can be employed to select parent ions having m/z ratios within a desired range. Further, in some such embodiments, the selected parent ions can undergo collision-induced fragmentation in a collision cell and the fragment ions can be mass analyzed by additional quadrupole mass analyzers disposed downstream of the collision cell.

Those having ordinary skill in the art will appreciate that various changes can be made to the above embodiments without departing from the scope of the invention.

What is claimed is:

1. A system for adjusting flow rate of at least one mobile phase delivered to a liquid chromatography (LC) column, comprising:

a first plurality of pre-calibrated flow modules each configured to receive a first mobile phase at an inlet port thereof and to provide a pre-calibrated range of output flow rates of said first mobile phase at its outlet port, wherein said first plurality of flow modules are configured to provide different ranges of output flow rates of said first mobile phase, a first purge module configured to receive the first mobile phase, a second plurality of pre-calibrated flow modules each configured to receive a second mobile phase at an inlet port thereof and to provide a pre-calibrated range of output flow rates of said second mobile phase at its outlet port, wherein said second plurality of flow modules are configured to provide different ranges of output flow rates of said second mobile phase relative to the flow rates provided by said first plurality of flow modules for the first mobile phase, a second purge module configured to receive the second mobile phase, and a first selector valve, wherein:

said first selector valve is in fluid communication with said first plurality of pre-calibrated flow modules for selecting from among said first plurality of pre-calibrated flow modules for selective delivery of said first mobile phase to said LC column, thereby adjusting the flow rate of the first mobile phase delivered to said LC column, said first selector valve is in fluid communication with said second plurality of pre-calibrated flow modules for selecting from among said second plurality of pre-calibrated flow modules for delivery of the second mobile phase to said LC column, thereby adjusting the flow rate of the second mobile phase delivered to said LC column, and said first selector valve is in fluid communication with said first purge module, said second purge module, and a waste container, and is configured to allow flows of the first and the second mobile phases received by the selector valve through the first and second purge modules, respectively, to be routed to a waste container.

2. The system of claim 1, further comprising a first container for storing said first mobile phase, said first container being in fluid communication with said first plurality of pre-calibrated flow modules for delivering said first mobile phase thereto.

3. The system of claim 2, further comprising a first pump for delivering said first mobile phase from said first container to said first plurality of flow modules.

4. The system of claim 3, further comprising a controller for adjusting a speed of said first pump for tuning the flow rate of said first mobile phase delivered to said first plurality of the flow modules.

5. The system of claim 1, wherein said first selector valve comprises a first plurality of inlet ports each of which is in fluid communication with an outlet port of one of said first plurality of flow modules and a first outlet port through which the first mobile phase exits the first selector valve.

6. The system of claim 4, further comprising a second container for storing said second mobile phase, said second container being in fluid communication with said second plurality of pre-calibrated flow modules for delivering said second mobile phase thereto.

7. The system of claim 6, further comprising a second pump for delivering said second mobile phase from said second container to said second plurality of pre-calibrated flow modules.

8. The system of claim 7, wherein said controller is configured to adjust a speed of said second pump for tuning the flow rate of said second mobile phase.

9. The system of claim 7, wherein said second pump is configured to provide a different dynamic range of fluid flow rate than a dynamic range of fluid flow rate provided by said first pump.

10. The system of claim 9, wherein said controller is configured to adjust a speed of any of said first and said second pump to change dynamically during run-time a flow rate of fluid delivered to said LC column.

11. The system of claim 10, wherein said first selector valve comprises a first plurality of inlet ports each of which is in fluid communication with an outlet port of one of said first plurality of flow modules and a first outlet port through which the first mobile phase exits said first selector valve.

12. The system of claim 11, wherein said first selector valve further comprises a second plurality of inlet ports each of which is in fluid communication with an outlet port of one of said second plurality of flow modules to receive said second mobile phase and further comprises a second outlet port through which the second mobile phase exits the selector valve.

13. The system of claim 12, further comprising a mixing element having a first inlet port for receiving said first mobile phase from said first outlet port of the first selector valve and a second inlet port for receiving said second mobile phase from said outlet port of the first selector valve to generate a mixed mobile phase, said mixing element having an outlet port for delivering said mixed mobile phase to said LC column.

14. The system of claim 3, further comprising a first pressure sensor disposed between said first pump and said first plurality of fluid flow modules for measuring fluid pressure delivered to said first plurality of fluid flow modules.

15. The system of claim 7, further comprising a second pressure sensor disposed between said second pump and said second plurality of fluid flow modules for measuring fluid pressure delivered to said second plurality of fluid flow modules.

16. The system of claim 12, further comprising a third pressure sensor disposed between the outlet ports of any of said first and said second plurality of fluid flow modules and said mixing element for measuring pressure of fluid delivered from any of said first and said second plurality of flow modules to said mixing element.

17. The system of claim 16, wherein said second pump is configured to provide a dynamic range of fluid flow that is different than a dynamic range of fluid flow provided by said first pump.

* * * * *